US009400824B2

(12) United States Patent
Weber

(10) Patent No.: US 9,400,824 B2
(45) Date of Patent: Jul. 26, 2016

(54) SYSTEMS AND METHODS FOR SORTING DATA

(71) Applicant: Google Inc., Mountain View, CA (US)

(72) Inventor: Nicolas T. Weber, Santa Cruz, CA (US)

(73) Assignee: GOOGLE INC., Mountain View, CA (US)

( * ) Notice: Subject to any disclaimer, the term of this patent is extended or adjusted under 35 U.S.C. 154(b) by 215 days.

(21) Appl. No.: 14/219,911

(22) Filed: Mar. 19, 2014

(65) Prior Publication Data

US 2015/0213023 A1 Jul. 30, 2015

Related U.S. Application Data

(63) Continuation of application No. 13/095,785, filed on Apr. 27, 2011, now Pat. No. 8,682,904.

(60) Provisional application No. 61/328,615, filed on Apr. 27, 2010.

(51) Int. Cl.
*G06F 17/30* (2006.01)

(52) U.S. Cl.
CPC ...... *G06F 17/3053* (2013.01); *G06F 17/30315* (2013.01)

(58) Field of Classification Search
CPC ....................... G06F 17/3053; G06F 17/30315
See application file for complete search history.

(56) References Cited

U.S. PATENT DOCUMENTS

| | | | | | |
|---|---|---|---|---|---|
| 7,231,596 | B2 * | 6/2007 | Koren | G06F 17/30893 | 707/E17.12 |
| 7,640,496 | B1 * | 12/2009 | Chaulk | G06F 3/067 | 707/999.102 |
| 7,966,333 | B1 * | 6/2011 | Uppala | G06F 17/30598 | 707/747 |
| 7,979,475 | B2 * | 7/2011 | Mack | G06F 17/30289 | 707/792 |
| 8,219,560 | B2 * | 7/2012 | Abhyankar | G06F 17/30643 | 707/738 |
| 8,239,393 | B1 | 8/2012 | Guo et al. | | |
| 2004/0267862 | A1 * | 12/2004 | Rarick | G06F 7/508 | 708/710 |
| 2006/0028471 | A1 * | 2/2006 | Kincaid | G06T 11/206 | 345/440 |
| 2008/0092033 | A1 * | 4/2008 | Palleschi | G06F 17/247 | 715/227 |
| 2010/0088315 | A1 * | 4/2010 | Netz | G06F 17/30501 | 707/737 |
| 2011/0191303 | A1 * | 8/2011 | Kaufman | G06F 17/30286 | 707/684 |
| 2011/0191343 | A1 * | 8/2011 | Heaton | G06F 19/3443 | 707/737 |
| 2011/0213766 | A1 * | 9/2011 | Hong | G06F 17/30312 | 707/718 |

* cited by examiner

*Primary Examiner* — Huawen Peng
(74) *Attorney, Agent, or Firm* — Morgan, Lewis & Bockius LLP

(57) ABSTRACT

Systems and methods for sorting data are disclosed. In some implementations, a method of sorting a set of data includes, at a computing device including one or more processors and memory, formatting the set of data for display using a first data column and a second data column. The first data column includes a first plurality of values; the first plurality of values is user-visible; the second data column includes a second plurality of values; and the second plurality of values is also user-visible. In some implementations, the method further includes, causing the set of data to be displayed in a sort order in accordance with a third plurality of sort parameters. The third plurality of sort parameters is calculated in accordance with (i) the first plurality of data values and (ii) the second plurality of data column; and the third plurality of sort parameter is user-invisible.

20 Claims, 12 Drawing Sheets

Table 100

102 104 106 108 110

| | A | | B | B/A | Weighted (B/A) |
|---|---|---|---|---|---|
| | | | | 0% | |
| | | | | 0% | |
| | | | | 0% | |
| | | | | 0% | |
| | | | | . | |
| | | | | . | |
| | | | | . | |
| | | | | 100% | |
| | | | | 100% | |
| | | | | 100% | |

Weight Function 200

Method 700 Continued

SYSTEMS AND METHODS FOR SORTING DATA

RELATED APPLICATIONS

This application is a continuation of U.S. patent application Ser. No. 13/095,785, filed Apr. 27, 2011, entitled "System of Intuitive Sorting of a Table Based on a Column Containing Fractions", which claims priority to U.S. Provisional Application Ser. No. 61/328,615, filed Apr. 27, 2010, entitled "System of Intuitive Sorting of a Table Based on a Column Containing Fractions" which applications are incorporated by reference herein in their entireties.

All above-identified patents and patent applications are hereby incorporated by reference in their entireties.

TECHNICAL FIELD

The disclosed embodiments relate generally to sorting tables. In particular, the disclose embodiments relate to a system and method for sorting tables based on a column containing fractions.

BACKGROUND

Internet traffic data may be analyzed to gain insight into the behavior of Internet users. For example, search queries and corresponding user clicks on search results may be used to improve search results for future search queries. The Internet traffic data may also be analyzed to investigate appeal of web site to Internet users. For example, an operator/owner of a website may be interested in the number of impressions (i.e., the number of views of an advertisement campaign), the number of click-throughs (i.e., the number of clicks the advertisement campaign received), and the number of conversions (i.e., the number of people that performed a desired action associated with the advertisement campaign) for the advertisement campaign.

Other Internet traffic data that a website operator/owner may be interested in includes aggregated data including a number of "visits" to a website, a number of visits viewing only one page, known as "bounces," and the ratio of the total number of bounces to the total number of visits, also known as "bounce rate." The bounce occurs when the website visitor only views a single page on a website and leaves the website without visiting any other pages within a predefined session timeout. The timeout is normally determined by the session timeout of the analytics tracking software.

The aggregated statistical data such as number of visits, number of bounces, bounce rates and so fourth can be presented to the website operator in graphical or tabular forms. When presented in tabular form, undesirable results may be displayed, for example, if a table is sorted based on a column that includes fractions. Such undesirable results may include scenarios where meaningful results do not appear at the top rows of a table.

BRIEF DESCRIPTION OF THE DRAWINGS

Like reference numerals refer to corresponding parts throughout the drawings.

SUMMARY

Figures 1, 2:
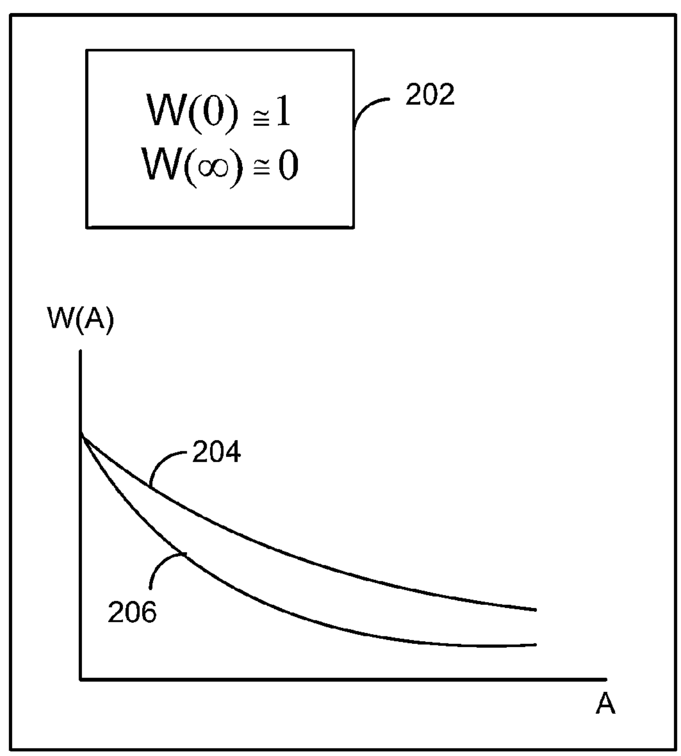
FIG. 1 shows a table to be sorted based on a column containing fractions, according to some embodiments.
FIG. 2 is a diagram showing a weight function used in sorting the table of FIG. 1, based on the column containing fractions, according to some embodiments.

Some embodiments provide systems and methods for sorting data. In some implementations, a method of sorting a set of data includes, at a computing device including one or more processors and memory, formatting the set of data for display using a first data column and a second data column. The first data column includes a first plurality of values; the first plurality of values is user-visible; the second data column includes a second plurality of values; and the second plurality of values is also user-visible. In some implementations, the method further includes, causing the set of data to be displayed in a sort order in accordance with a third plurality of sort parameters. The third plurality of sort parameters is calculated in accordance with (i) the first plurality of data values and (ii) the second plurality of data column; and the third plurality of sort parameter is user-invisible.

Some embodiments provide a system, a computer-readable storage medium including instructions, and a computer-implemented method for sorting a table based on a column containing fractions whose values represent ratios of values (including values in other table columns). In some embodiments, the data stored in the table may be stored in memory of a computer or come from other stored data structures. In the table, first, second, and third columns are identified. The first column represents values of a first parameter (e.g., number of visits to a website), the second column represents values of a second parameter (e.g., number of bounces associated with the visits), and the third column represents values of a third parameter. The third parameter is defined as the ratio of the second parameter to the first parameter (e.g. a fraction such as a bounce rate; hereinafter, also called "ratio column,"). Then, a fourth column representing values of a fourth parameter (e.g., a weighted-sum as defined below) is generated.

The fourth column has a relation to the third parameter that is defined in terms of a weighted sum of the values of the third parameter and an average value associated with the values of the third parameter using a weight function (hereinafter, occasionally identified as "W"). The weight function is defined as a monotonically decreasing function of the values of the first parameter. The weight function is defined such that its value is substantially equal to unity when values of the first parameter substantially equal to zero, and is substantially equal to zero when values of the first parameter exceed a threshold (e.g., is equal or larger than, for example, 10 times a predefined constant discussed below). The rows of the table are sortable in ascending or descending order based on the values of the fourth parameter.

The fourth column may be invisible to a viewer. In some embodiments, the second column (e.g., the number of bounces) is optionally made invisible as, for instance, in the screen shots of FIGS. 8-12. In general, displaying of the table is not limited to showing all data columns. In some embodiments, only the ratio column or the ratio column and the first column (i.e. the column associated with the denominator of the ratio) may be displayed.

In some embodiments, the tables may be used to display data related to Internet traffic associated with a website. The data may include, for example, number of visits of the website by Internet users, the number of pages viewed per visit, average time spent by the visitor on the website, percentage of new visits, bounce rates, and so forth as will be discussed in more detail with respect to FIGS. 8-12.

In some embodiments, a system for sorting a table includes one or more processors and a memory coupled to the processor. The memory retains the table and program modules. The program modules include an identification module that identifies within the table first and second columns, respectively, that embody values of a first and a second parameter, and a third column that embodies values of a third parameter. The third parameter is defined as the ratio of the second parameter to the first parameter.

In some embodiments, the system also includes a generation module that generates a fourth column. The fourth column embodies values of a fourth parameter, the fourth parameter having a relation to the third parameter and an average value associated with the values of the third parameter using a weight function. The weight function is defined as a monotonically decreasing function of the values of the first parameter, such that weight function is approximately equal to unity, for values of the first parameter approximately equal to zero, and approximately equal to zero for values of the first parameter exceeding a threshold. The system further includes a sorting module to sort in ascending or descending order the rows of the table based on the values of the fourth parameter.

In some embodiments, a non-transitory computer-readable storage medium stores one or more programs configured for execution by one or more processors and comprising instructions for operating on a table stored in memory. In some embodiments, the operations include identifying a first column in the table embodying values of a first parameter, a second column in the table embodying values of a second parameter, and a third column in the table embodying values of a third parameter defined as the ratio of the second parameter to the first parameter. The operations also include generating a fourth column in the table embodying values of a fourth parameter having a relation to the third parameter defined in terms of a weighted sum of the values of the third parameter and an average value associated with the values of the third parameter using a weight function. The weight function is defined as a monotonically decreasing function of the values of the first parameter, such that the weight function is substantially equal to unity, for values of the first parameter substantially equal to zero, and substantially equal to zero, for values of the first parameter exceeding a threshold. The operations also include sorting in ascending or descending order the rows of the table based on the values of the fourth parameter.

In some embodiments, a system for sorting a table comprises a computer-readable medium including instructions that when executed by one or more processors perform a method. The method includes identifying within the table first and second columns, respectively, that embody values of a first and a second parameter, and a third column that embodies values of a third parameter. The third parameter is defined as the ratio of the second parameter to the first parameter.

In some embodiments, the method also includes generating a fourth column. The fourth column embodies values of a fourth parameter, the fourth parameter having a relation with the third parameter and an average value associated with the values of the third parameter using a weight function. The weight function is defined as a monotonically decreasing function of the values of the first parameter, such that weight function is approximately equal to unity, for values of the first parameter approximately equal to zero, and approximately equal to zero for values of the first parameter exceeding a threshold. The system also includes a sorting module to sort in ascending or descending order the rows of the table based on the values of the fourth parameter. The method may further include sorting in ascending or descending order the rows of the table based on the values of the fourth parameter.

In some embodiments, a client device comprises one or more processors, a communication interface, and memory. The communication interface receives a sorted table from a server, the received sorted table including an invisible weighted-sort column generated in relation to a ratio column, the values of which is defined as a ratio of value of a second column to a respective values of a first column. The memory is coupled to the one or more processors and is configured to store the received sorted table and a user interface module. The user interface module is configured to display on a user interface the received sorted table and one or more display elements, the sorted table being sorted by the server based on the invisible weighted-sort column, resulting in values of the ratio column for which associated values of the first column are meaningful being displayed at the top and the bottom of the sorted table.

In some embodiments, a method for use at a client device having one or more processors, a communications interface, and memory comprises receiving a sorted table and displaying the sorted table. Receiving the sorted table involves receiving the sorted table from a server, the received sorted table including an invisible weighted-sort column generated in relation to a ratio column, the values of which is defined as a ratio of value of a second column to a respective values of a first column. Displaying the sorted table includes displaying on a user interface the received sorted table and one or more display elements, the sorted table being sorted by the server based on the invisible weighted-sort column, resulting in values of the ratio column for which associated values of the first column are meaningful being displayed at the top and the bottom of the sorted table.

DESCRIPTION OF EMBODIMENTS

Reference will now be made in detail to embodiments, examples of which are illustrated in the accompanying drawings. While the invention will be described in conjunction with the embodiments, it will be understood that the invention is not limited to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

FIG. 1 shows a Table 100, stored in a memory of a computer system, to be sorted based on a column containing fractions, according to some embodiments. Table 100 may include multiple rows and columns, where each of the column stores values of a respective parameter and each of the rows stores respective collection of associated values. In some embodiments, parameters shown in Table 100 correspond to Internet traffic data associated with a website that are provided by web analytics services. For example, columns 104 and 106 store values of a first parameter A (e.g., number of visits associated with the website) and a second parameter B (e.g., number of bounces associated with the visits), respectively. Column 108 represents a ratio column storing values of a fraction B/A. In some embodiments, the second column 106 may be invisible when the table 100 or a portion there is displayed.

In practice, values of the parameters A or B may occasionally be very small (e.g., just one). For instance, consider a case where Table 100 represents traffic data associated with a website for certain searched keywords (e.g., row values of column 102). The number of visits to the website (e.g., values of parameter A) for certain keywords may be one or two. Also, for cases that a keyword search ended up in a visit by a visitor to the website, it is possible that the visitor viewed more than one page in that visit, which will result in a zero value for the bounce parameter (e.g., values of parameter B). Therefore, the stored values for either of the parameter A or B in certain rows may end up being zero or very small. This scenarios will produce ratio (B/A) values that are either zero or unacceptably large (i.e., out of bound values).

Yet there may be numerous other scenarios where the ratio column stores values of 100%. For example, any time that a keyword search results in a single visit to the website (A=1) and in that visit, the visitor views only a single page (B=1), the bounce rate (B/A) at the row associated with that keyword would be 100%. Now if Table 100 is large (e.g., including hundreds of rows), then anytime the table is sorted, in ascending order or descending, based on the ratio column 108, the top rows of the table will show results with values of the ratio B/A which are either 0% or 100%. Such results are not considered desired, because the more "significant" (defined here as different from 0% or 100%) values of the ratio column will be stored in rows that are not in a visible view of a viewer of the sorted table. For example, if Table 100 has 2000 column and in each screen only 20 rows can be viewed, the viewer may have to scroll many pages before reaching the rows including meaningful values.

In order to perform the sorting such that a meaningful result/display is achieved, a new column 110 (e.g., a fourth column, also referred to herein as "weighted-sort" column) is generated that represents values of a fourth parameter. The fourth parameter will be a weighted sum (WS) defined as a function of the fraction B/A for a particular column. In some embodiments, the relation between the weighted sum and the ratio B/A is given as, but is not limited to:

$$WS_i \cong (1-W)(B_i/A_i)+W(\Sigma B/\Sigma A) \qquad \text{Eq. 100}$$

Where, W is a weight function, i is a row index, $B_i$ and $A_i$ are values of parameters A and B for row i, and the term (ΣB/ΣA) is an average value associated with the ratio B/A. The summations ΣA and ΣB are performed over all values of index i corresponding to the entire rows of the columns 104 and 106, respectively. In some embodiments, $WS_i$ is computed for the entire rows of Table 100. The weight function is a function of the parameter A as described below with respect to FIG. 2. The weighted sum described above, when used to sort the Table 1, generates a desired result. The desired result in this case is defined as a sorted table, in which the values of the ratio B/A associated with "meaningful values" of the first parameter A are displayed in the top and bottom rows of the table, depending on ascending or descending sorting of the table based on the weighted sum WS. The "meaningful values" are defined as the values A which are non-trivial values (such as values other than 0, 1, etc., for the number of visits of a website).

FIG. 2 is a diagram showing the weight function W used in sorting Table 1 of FIG. 1, based on the column containing fractions, according to some embodiments. The weight function W is shown as a function of the values of the parameter A of column 104 of Table 1 (FIG. 1). The Weight function W is a monotonically decreasing function of the parameter A, with the condition shown in condition equations 202 (FIG. 2). The condition equations 202 states that the value of the weight function W should be substantially equal to zero for large values of the parameter A (e.g., larger than a predefined value such as 2,000), and substantially equal to unity for very small values (e.g., trivial values such as 1 and 2) of the parameter A. Two functions 204 and 206 shown in FIG. 2 that closely satisfy the condition equations 202 may be given as:

$$\frac{K}{K+A} \qquad \text{Eq. 204}$$

$$e^{-KA} \qquad \text{Eq. 206}$$

Where, Eqs. 204 and 206 respectively correspond to functions 204 and 206 shown in FIG. 2 and K is a constant. The constant K takes proper values that would enable the Eqs. 204 and 206 to satisfy the condition equations 202. In general, a proper value for the constant K would depend on the values of the parameter A. In some embodiments, the value of the constant K can be derived from the following equation:

$$K \cong \text{Max}\{200,(0.01\Sigma A)\} \qquad \text{Eq. 210}$$

Where, K is defined to be approximately equal to the maximum of 200 and 1% of the sum of all values of A. for example, when sum of all values of A (i.e. ΣA) is 300, the proper value of K would be approximately equal to 203.

Referring back to FIG. 1, as mentioned before, Table 100 of FIG. 1 may include Internet traffic data associated with a website provided by web analytics services. The website may be supported by a web server (e.g., a web server 300 shown in FIG. 3). Table 100 of FIG. 1 may include Internet traffic statistical data collected and stored by a server (e.g., a server system 306 shown in FIG. 5). The server may transmit the sorted table for display to a client device (e.g., a client device 302 shown in FIG. 6). In some embodiments, the server may be a standalone computer system which can display the sorted table. The server, the web server, and the client device may comprise a client server (e.g., a client-server system 300 shown in FIG. 3) linked to each other via a network, as shown and described below with respect to FIG. 3.

Figure 3:
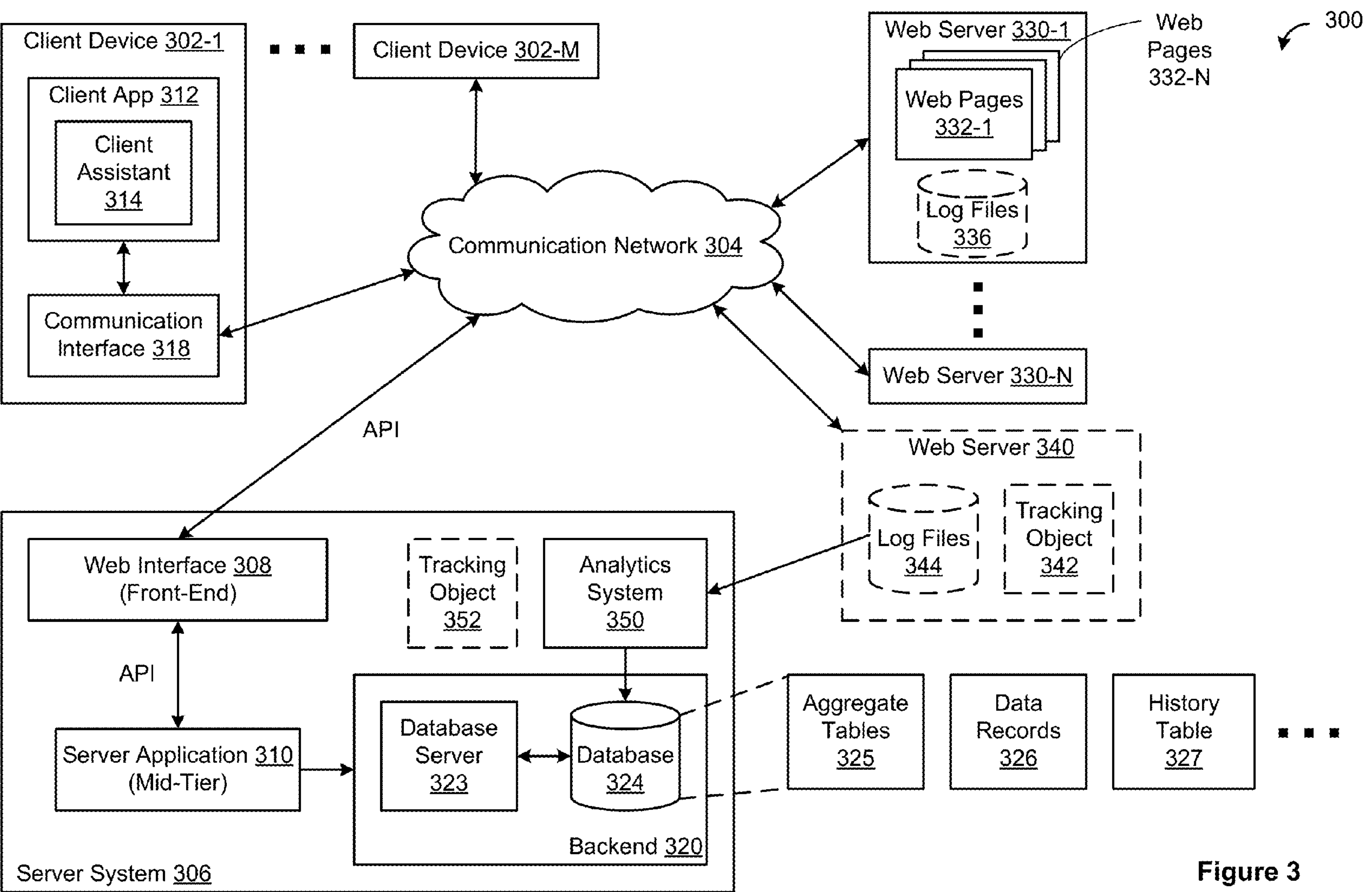
FIG. 3 is an overview block diagram of a client-server system for sorting a table based on a column containing fractions, according to some embodiments.

FIG. 3 is an overview block diagram of a client-server server system 300 for sorting Table 100 of FIG. 1, based on a column containing fractions, according to some embodiments. The client-server server system 300 includes a number of client devices 302 connected to a server system 306 through one or more communication networks 304.

A client device 302 (also known as a "client") may be any computer or similar device through which a user of the client device 302 can submit data access requests to and receive results or other services from the server system 306, web servers 330, and/or web server 340. Examples include, without limitation, desktop computers, laptop computers, tablet computers, mobile devices such as mobile phones, personal digital assistants, set-top boxes, or any combination of the above. A respective client 302 may contain at least one client application 312 for submitting requests to the server system 306, the web servers 330, and/or the web server 340. For example, the client application 312 can be a web browser or other type of application that permits a user to access the services provided by the server system 306, the web servers 330, and/or the web server 340.

In some embodiments, the client application 312 includes one or more client assistants 314. A client assistant 314 can be a software application that performs tasks related to assisting a user's activities with respect to the client application 312 and/or other applications. For example, the client assistant 314 may assist a user at the client device 302 with browsing information (e.g., web pages retrieved from the web servers 330 and/or 340), processing information (e.g., query results) received from the server system 306, and monitoring the user's activities on the query results. In some embodiments, the client assistant 314 is embedded in a web page (e.g., a query results web page) or other documents downloaded from the server system 306. In some embodiments, the client assistant 314 is a part of the client application 312 (e.g., a plug-in application of a web browser). The client 302 further includes a communication interface 318 to support the communication between the client 302 and other devices (e.g., the server system 306 or another client device 302).

The communication network(s) 304 can be any wired or wireless local area network (LAN) and/or wide area network (WAN), such as an intranet, an extranet, the Internet, or a combination of such networks. In some embodiments, the communication network 304 uses the HyperText Transport Protocol (HTTP) and the Transmission Control Protocol/Internet Protocol (TCP/IP) to transport information between different networks. The HTTP permits client devices to access various information items available on the Internet via the communication network 304. The various embodiments of the invention, however, are not limited to the use of any particular protocol.

In some embodiments, the server system 306 includes a web interface 308 (also referred to as a "front-end server"), a server application 310 (also referred to as a "mid-tier server"), and a backend server 320. The web interface 308 receives data access requests from client devices 302 and forwards the requests to the server application 310. In response to receiving the requests, the server application 310 decides how to process the requests including identifying data filters associated with a request, checking whether it has data available for the request, submitting queries to the backend 320 for data requested by the client, processing the data returned by the backend 320 that matches the queries, and returning the processed data as results to the requesting clients 302. After receiving a result, the client application 312 at a particular client 302 displays the result to the user who submits the original request.

In some embodiments, the backend 320 is effectively a database management system including a database server 323 that is configured to manage a database 324. In some embodiments, the database 324 is stored at the server system 306. In some embodiments, the database 324 is located on a computer system that is separate and distinct from the server system 306. In some embodiments, the database 324 includes aggregate tables 325. Aggregate tables include data that is aggregated on a periodic basis and allows the server system 306 to quickly provide results for data that is commonly requested. The aggregate tables 325 may be the same or similar to Table 1 of FIG. 1, and be sorted by the server system 306 as described below with respect to FIG. 5. In some embodiments, the aggregate table 325 may also include columns showing data associated with number of visits, number of bounces, and bounce rates.

In some embodiments, the database 324 includes data records 326. In response to a query submitted by the server application 616, the database server 323 identifies zero or more data records that satisfy the query and returns the data records to the server application 310 for further processing. In some embodiments, the database 324 includes a history table 327 that stores tracking events. In some embodiments, the tracking events include a conversion event that is generated when a user performs a predetermined action on a website (e.g., purchasing a product or service associated with the advertisement, visiting a website associated with the advertisement, and completing a survey, etc.), an impression event that is generated when an advertisement is displayed to a user, and/or a click-through event that is generated when a user clicks on an advertisement. In some embodiments, the website is selected from the group consisting of an e-commerce website, an auction website, a multimedia-download website, a charitable contribution website, and a survey website. These embodiments are described in more detail with respect to FIGS. 3-4 and 9-11 below.

In some embodiments, the database 324 is a distributed database. In some embodiments, the distributed database is a multi-dimensional sorted map. For example, the multi-dimensional sorted map may be a BigTable.

In some embodiments, the server system 306 is an application service provider (ASP) that provides web analytics services to its customers (e.g., a web site owner) by visualizing the traffic data generated at a web site in accordance with various user requests. To do so, the server system 306 may include an analytics system 350 adapted for processing the raw traffic data of a web server 330 and other types of traffic data generated by the web server 330 through techniques such as page tagging. Note that the traffic data may include any type of user traffic (e.g., requests for static or dynamic web pages, traffic from mobile applications, requests by and request for Flash applications, etc.). In some embodiments, the traffic data includes tracking events produced from user actions on the web servers 330. In some embodiments, the server system 306 analyzes the traffic data to identify tracking events that lead up to a conversion event. For example, the server system 306 may identify a conversion event produced by actions of a user on a first website. Based on the conversion event, the server system 306 may then identify all (or a subset of) the tracking events (e.g., impression events, click-through events, and/or conversion events) associated with the user and the first website that occurred prior in time to the particular conversion event. Note that the tracking events can be generated in response to actions of a user other websites (e.g., websites other than the first website).

In some embodiments, the raw traffic data is obtained from log files 336 of the web servers 330. In these embodiments, the web servers 330 provide access to the log files 336 to the analytics system 350.

In some embodiments, the raw traffic data is obtained from log files 344 of a web server 340. In these embodiments, content providers insert tracking code (e.g., a script) into documents (e.g., web pages 332) for which the content providers desire to obtain traffic data. When these documents are accessed by users, the tracking code is executed and a request for a tracking object 342 (e.g., a specified image file) on the web server 340 is generated. In some embodiments, the request for the tracking object 342 includes parameters that provide information about the page being requested. The request for the tracking object 342 is recorded in the log files 344, including any parameters associated with the request for the tracking object. In some embodiments, the web servers 340 include the tracking object 342 that the analytics system 350 uses to track hits to web pages 332. In these embodiments, the analytics system 350 obtains the log files from the web servers 330.

In some embodiments, the raw traffic data is transmitted directly from the client devices 302 to the analytics system 350. In these embodiments, content providers insert tracking code (e.g., a script) into documents (e.g., web pages 332) for which the content providers desire to obtain traffic data. When these documents are accessed by users, the tracking code is executed by the client devices 302 and a request for a tracking object 352 (e.g., a specified image file) on the server system 306 is generated. The analytics system 350 receives the request from the client devices 332, processes the raw traffic data, and stores attribute-value pairs associated with the raw traffic data in the database 324. In some embodiments, the request for the tracking object 352 includes parameters that provide information about the page being requested.

In some embodiments, the tracking object 342 (or 352) is a tracking object for an advertisement associated with a website. In these embodiments, when a client assistant (e.g., the client assistant 314) of a client device (e.g., the client device 302-1) displays the advertisement associated with the website, the client assistant executes code associated with the advertisement that generates a request for the tracking object 342 (or 352), wherein the request includes parameters indicating that the advertisement was displayed (i.e., an impression of the advertisement was produced). This request for the tracking object 342 (or 352) generates an impression event in the log files 344 (or an impression event on the server system 306). When a user of the client device clicks on the displayed advertisement, client assistant executes code associated with the advertisement that generates a request for the tracking object 342 (or 352), wherein the request includes parameters indicating that the advertisement was clicked (i.e., a click-through of the advertisement was produced). This request for the tracking object 342 (or 352) generates a click-through event in the log files 344 (or a click-through event on the server system 306). When a user performs a predetermined action on the website associated with the advertisement, the website (or alternatively, the client assistant 314) generates a request for the tracking object 342 (or 352) that includes parameters indicating that the predetermined action on the website was performed by the user. This request for the tracking object 342 (or 352) generates a conversion event in the log files 344 (or a conversion event on the server system 306). Note that the user may have been shown the advertisement and/or the user may have clicked on the advertisement a number of times over a period of time prior to performing the predetermined action on the website associated with the advertisement (i.e., generating the conversion event). The embodiments described herein disclose techniques for tracking the tracking events leading up to the conversion event.

Note that in any of the aforementioned techniques, the raw traffic data may be included in an activity file. For example, the activity file may be the log files 336, the log files 344, or the raw traffic data received directly from the client devices 332. Also note that for the sake of clarity, the disclosed embodiments are described with respect to using the web server 340 to tracking requests web pages of a web site using the tracking object 342 and log files 344. However, any of the techniques for acquiring raw traffic data may be used. Furthermore, note that any technique for tracking raw traffic data may be used. For example, the raw traffic data may be stored in cookies on a client computer system that is periodically transmitted to the server system 306 for analysis, as described herein. Similarly, the raw traffic data may be stored on a client computer system (e.g., using a cookie, a database, etc.) and analyzed locally on the client computer system using the techniques described herein. The analyzed data may then be transmitted to the server system 306 for storage.

After the raw traffic data is obtained from the activity files, the raw web traffic data is first processed into a multidimensional dataset that includes multiple dimensions and multiple metric attributes (or measures) before the server system 306 can answer any data visualization requests through the web interface 308. A more detailed description of the processing of raw web traffic data can be found in the U.S. Provisional Patent Application No. 61/181,275, filed May 26, 2009, entitled "System and Method for Aggregating Analytics Data" and the U.S. Provisional Patent Application No. 61/181,276, filed May 26, 2009, entitled "Dynamically Generating Aggregate Tables", the contents of which are incorporated by reference herein in their entirety. For simplicity, it is assumed herein that the data records managed by the backend 320 and accessible to the server application 330 are not the raw web traffic data, but the data after being pre-processed. Note that the traffic data may be sessionized and/or aggregated.

Figure 4:
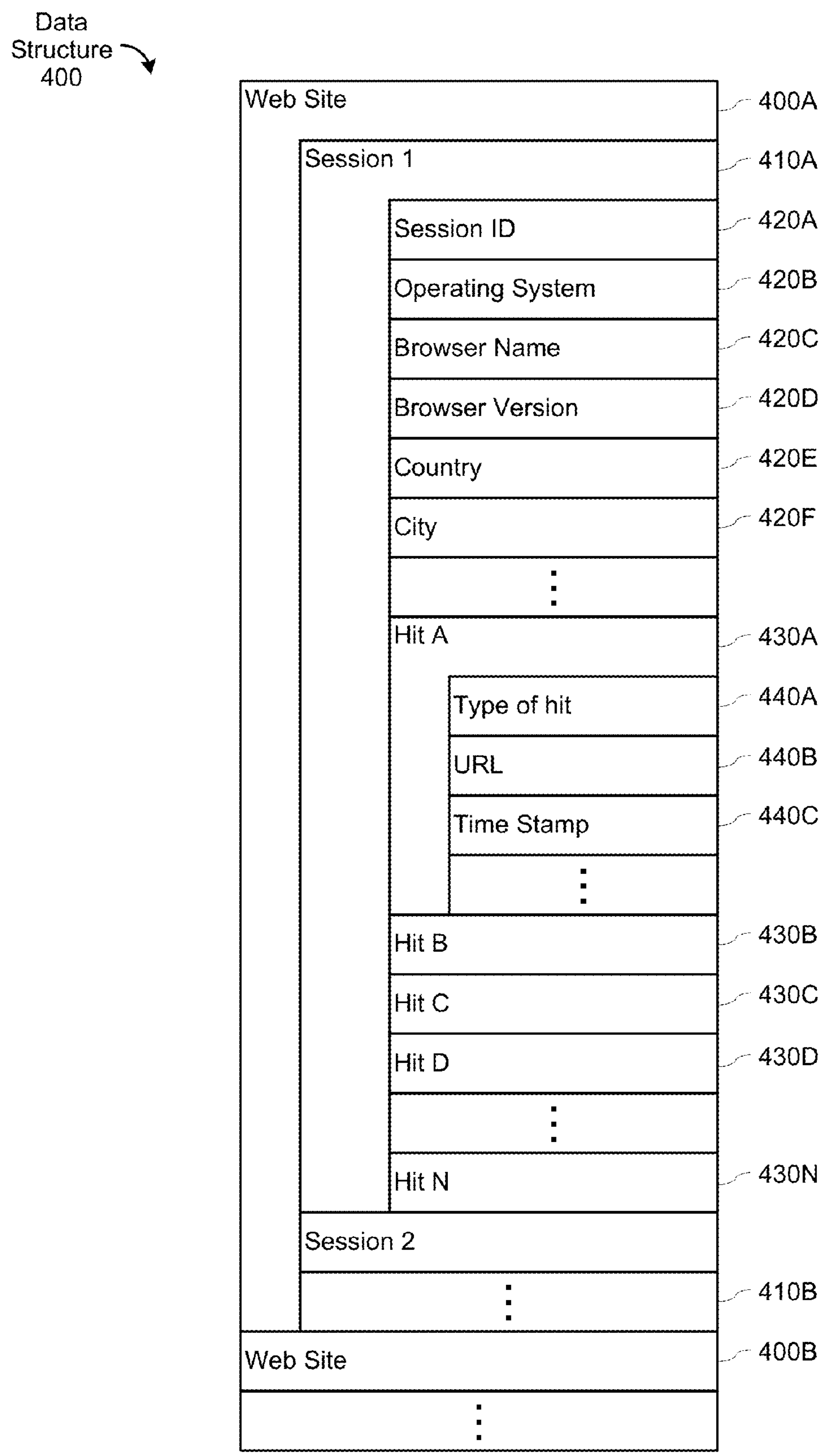
FIG. 4 is a block diagram of an exemplary data structure used for storing traffic data at different web sites, according to some embodiments.

FIG. 4 is a block diagram of an exemplary data structure 400 used for storing traffic data at different web sites, according to some embodiments. The web traffic data stored in the data structure 400 corresponds to the backend data records 326 from different websites, for each session associated with the respective website. The web data stored in the data structure 400 have a hierarchical structure. The top level of the hierarchy corresponds to different web sites 400A, 400B, etc. (i.e., different web servers). For a respective web site, the traffic data is grouped into multiple sessions 410A, 410B, etc. and each session has a unique session ID 420A. A session ID uniquely identifies a user's session with the web site 400A for the duration of that user's visit. Within a session 410A, other session-level attributes include operating system 420B (i.e., the operating system the computer runs on from which the user accesses the web site), browser name 420C (i.e., the web browser application used by the user for accessing the web site) and browser version 420D, geographical information of the computer such as the country 420E and the city 420F, etc.

For convenience and custom, the web traffic data of a user session (or a visit) is further divided into one or more hits 430A to 430N. Note that hits 430A to 430N are also referred to as "hit records" or "database hit records" 430A to 430N. Also note that the terms "session" and "visit" are used interchangeably throughout this application. In the context of web traffic, a hit typically corresponds to a request to a web server for a document such as a web page, an image, a JavaScript file, a Cascading Style Sheet (CSS) file, etc. Each hit 430A may be characterized by attributes such as type of hit 440A (e.g., transaction hit, etc.), referral URL 440B (i.e., the web page the visitor was on when the hit was generated), a timestamp 440C that indicates when the hit occurs and so on.

Note that the session-level and hit-level attributes as shown in FIG. 4 are listed for illustrative purposes only. As will be shown in the examples below, a session or a hit may have many other attributes that either exist in the raw traffic data (e.g., the timestamp) or can be derived from the raw traffic data by the analytics system 350 (e.g., the average page views per session). The number of visits (parameter A) and bounces (parameter B), as shown in Table 100 of FIG. 1, are in fact aggregated values generated based on these session data received from various web servers 330 (FIG. 3).

Referring back to FIG. 3, a user at a client device 302 submits a request to the server system 306 for generating a report of the web traffic data associated with a particular web site. Upon receipt of the request, the server application 310 generates or identifies one or more queries and submits the queries to the backend server 320 that manages the web site's "sessionized" traffic data in the data structure 400 and processes the query results returned by the backend server 320 such that they can be visualized at the client device 302 in the form of a web analytics report. Note that the traffic data may also be aggregated.

The process of generating a web analytics report is described in detail in U.S. patent application Ser. No. 12/575,437, filed Oct. 7, 2009, entitled "Method and System for Generating and Sharing Dataset Segmentation Schemes," the content of which is incorporated by reference herein in its entirety.

Figure 5:
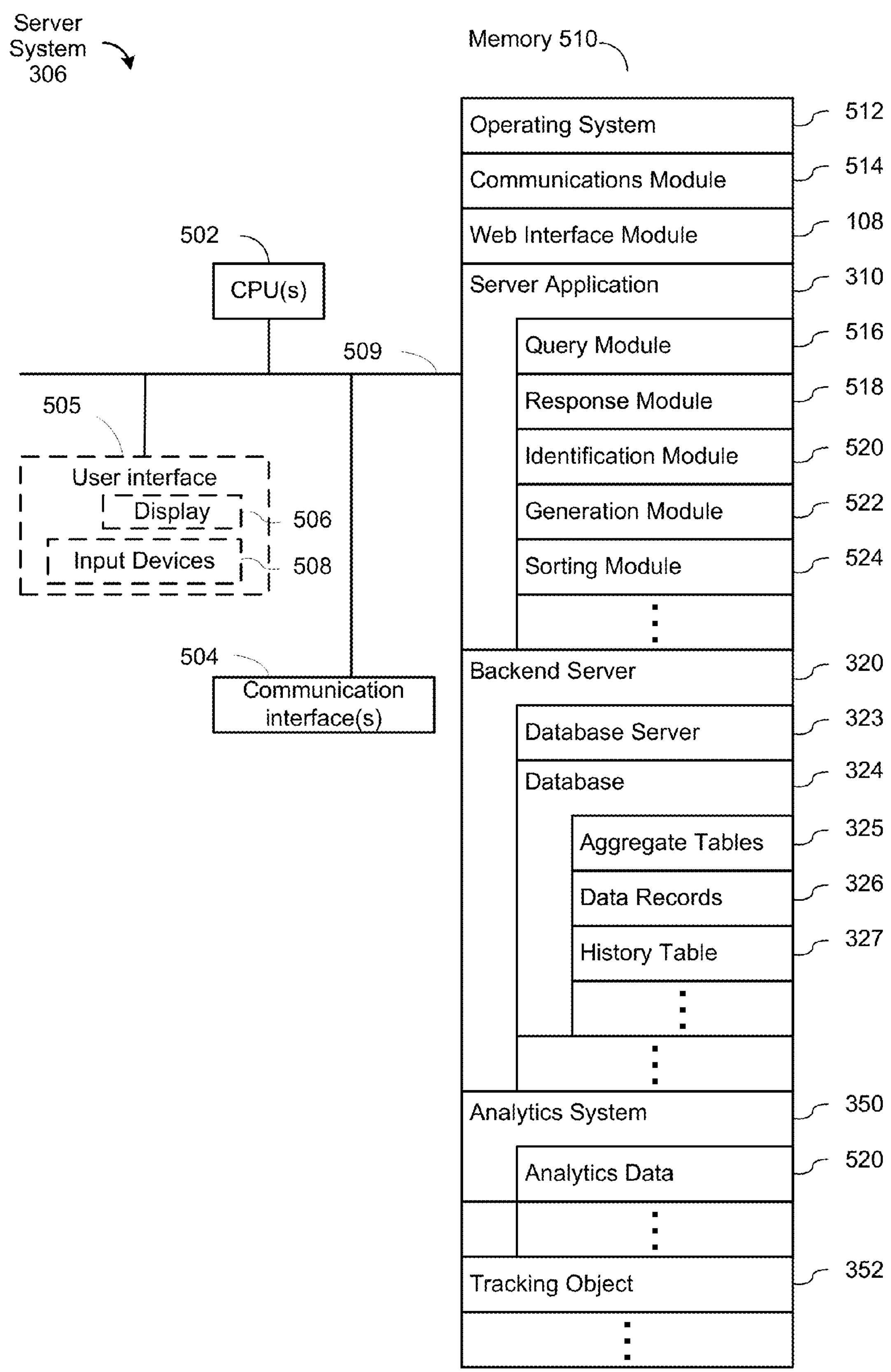
FIG. 5 is a block diagram of a server system for presenting and providing access to custom variables for web analytics including a sorted table to be displayed at a requesting client device, according to some embodiments.

FIG. 5 is a block diagram of a server system 306 for presenting and providing access to web analytics including a sorted table to be displayed at a requesting client device, according to some embodiments. The server system 306 generally includes one or more processing units (CPU's) 502, one or more network or other communications interfaces 504, memory 510, and one or more communication buses 509 for interconnecting these components. The server system 306 may optionally include a user interface 505 comprising a display device 506 and input devices 508 (e.g., a keyboard, a mouse, a track pad, etc.). Memory 510 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 510 may optionally include one or more storage devices remotely located from the CPU(s) 502. Memory 510, or alternately the non-volatile memory device (s) within memory 510, comprises a computer readable storage medium. Memory 510 or the computer readable storage medium of memory 510 stores the following elements, or a subset of these elements, and may also include additional elements:

- an operating system 512 that includes procedures for handling various basic system services and for performing hardware dependent tasks;
- a network communication module 514 that is used for connecting the server system 306 to other computers such as the clients 302 and the web servers 330 and 340 via the communication network interfaces 304 (wired or wireless) and one or more communication networks, such as the Internet, other wide area networks, local area networks, metropolitan area networks, and so on;
- a web interface module 308 for receiving requests from client devices and returning reports in response to the client requests;
- a server application 310, including a query module 516 for converting client requests into one or more queries or data filters targeting at the backend 320; a response module 518 for preparing analytics reports based on the response from the backend 320; an identification module 520 for identifying the first, second, and third parameters (e.g., parameters of columns 104, 106, and 108) in a table wherein one column includes ratio data, such as in the Table 100 Table 100 of FIG. 1), where the third parameter is a fraction represented by the ratio of the second parameter to the first parameter (e.g., B/A); a generation module 520 to generate a fourth column in Table 100, wherein the fourth column is a weight-sorted column that stores values of a weighted sum parameter, as described above with respect to FIGS. 1 and 2; and a sorting module 524 that sorts Table 100 based on the values of the fourth column, as described above with respect to FIGS. 1 and 2;
- a backend server 320 including a database server 323 aggregates data records 326 such as the session data records shown in FIG. 4, and the history table 327 as described herein;
- a web analytics system 350 for pre-processing the log files into the sessionized web traffic data records 326 to generate aggregate table 325 and for generating analytics data 520 (e.g., reports, graphs, tables, etc. such as shown in screen shots of FIGS. 8-12) that are displayed to an analytics user (e.g., on the client device 302); and
- a tracking object 352 that is a target of requests that provide raw web traffic data to the analytics system 350.

Figure 6:
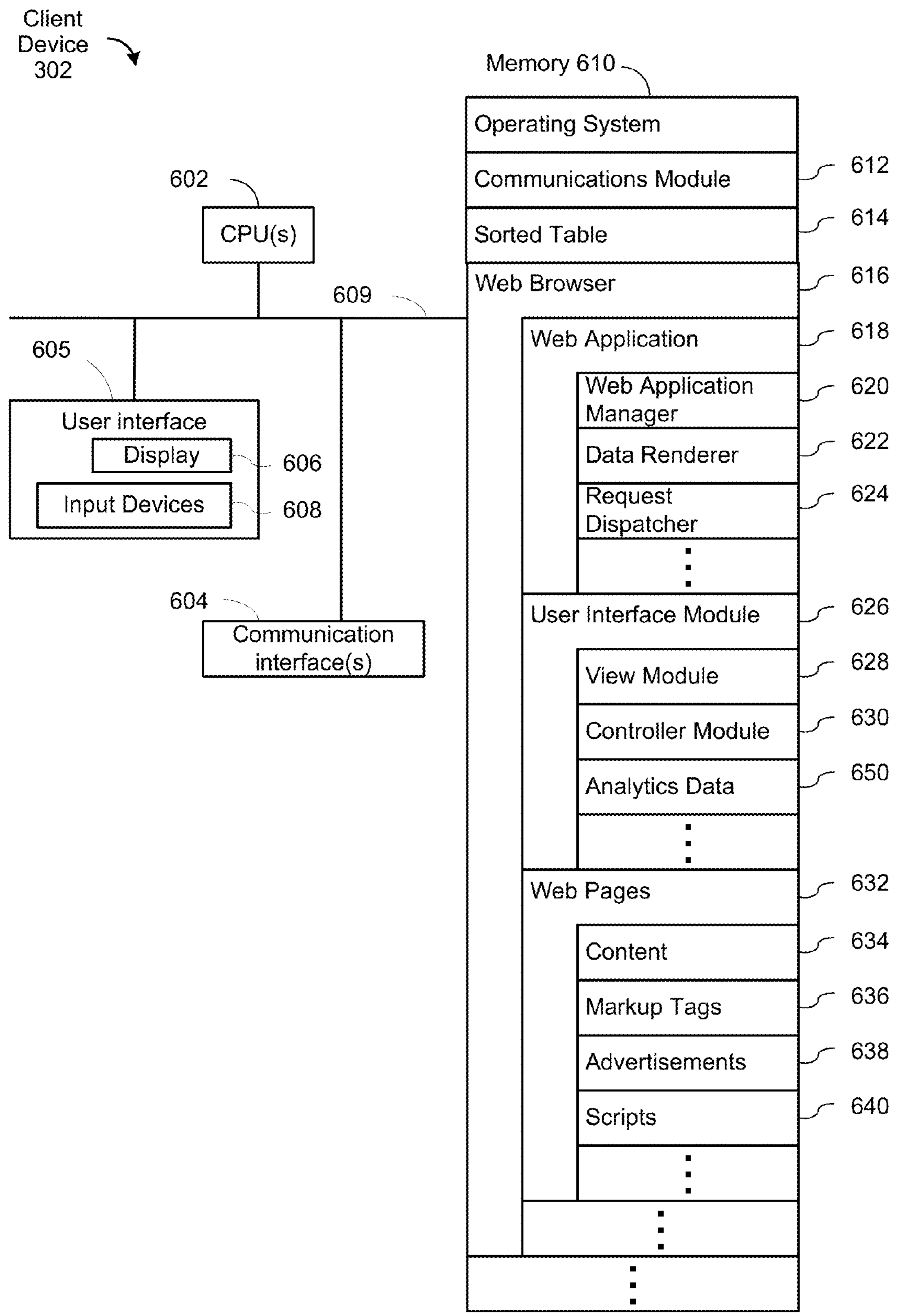
FIG. 6 is a block diagram of a client device for accessing web analytics data provided by the server of FIG. 5 and receiving the sorted table, according to some embodiments.

FIG. 6 is a block diagram of a client device 302 for accessing web analytics data provided by the server of FIG. 5 and receiving the sorted table, according to some embodiments. The client device 302 generally includes one or more processing units (CPU's) 602, one or more network or other communications interfaces 604, memory 610, and one or more communication buses 609 for interconnecting these components. The communication buses 609 may include circuitry (sometimes called a chipset) that interconnects and controls communications between components. The client device 302 may optionally include a user interface 605, for instance, a display device 606, input devices 608 (e.g., a keyboard, a mouse, a track pad, a touch-sensitive surface, etc.). Memory 610 may include high speed random access memory, such as DRAM, SRAM, DDR RAM or other random access solid state memory devices; and may also include non-volatile memory, such as one or more magnetic disk storage devices, optical disk storage devices, flash memory devices, or other non-volatile solid state storage devices. Memory 610 may include mass storage that is remotely located from the central processing unit(s) 602. Memory 610, or alternately the non-volatile memory device(s) within memory 610, comprises a computer readable storage medium. Memory 610 or the computer readable storage medium of memory 610 stores the following elements, or a subset of these elements, and may also include additional elements:

- an operating system 612 that includes procedures for handling various basic system services and for performing hardware dependent tasks;
- a communication module 614 that is used for connecting the client device 302 to other servers or computers including the server system 306, web servers 330, and web server 340, via one or more communication network interfaces 604 (wired or wireless), such as the Internet, other wide area networks, local area networks, and metropolitan area networks and so on;

a web browser 616 (e.g., the client application 312), including a web application manager 620 (e.g., the client assistant 314) for managing the user interactions with the web browser, a data render 622 for supporting the visualization of an analytics report such as tables and graphs displayed in the screen shots 800-1200 shown in FIGS. 8-12, and a request dispatcher 624 for submitting user requests for new analytics reports;

a user interface module 626, including a view module 628 and a controller module 630, for detecting user instructions to control the visualization of the analytics data 650 (e.g., raw traffic data, reports, graphs, tables, etc.) generated by the server system 306;

web pages 632 including content 634, markup tags 636, advertisements 638, and scripts 640 (e.g., scripts for generating requests for the tracking object 342).

Figure 7A:
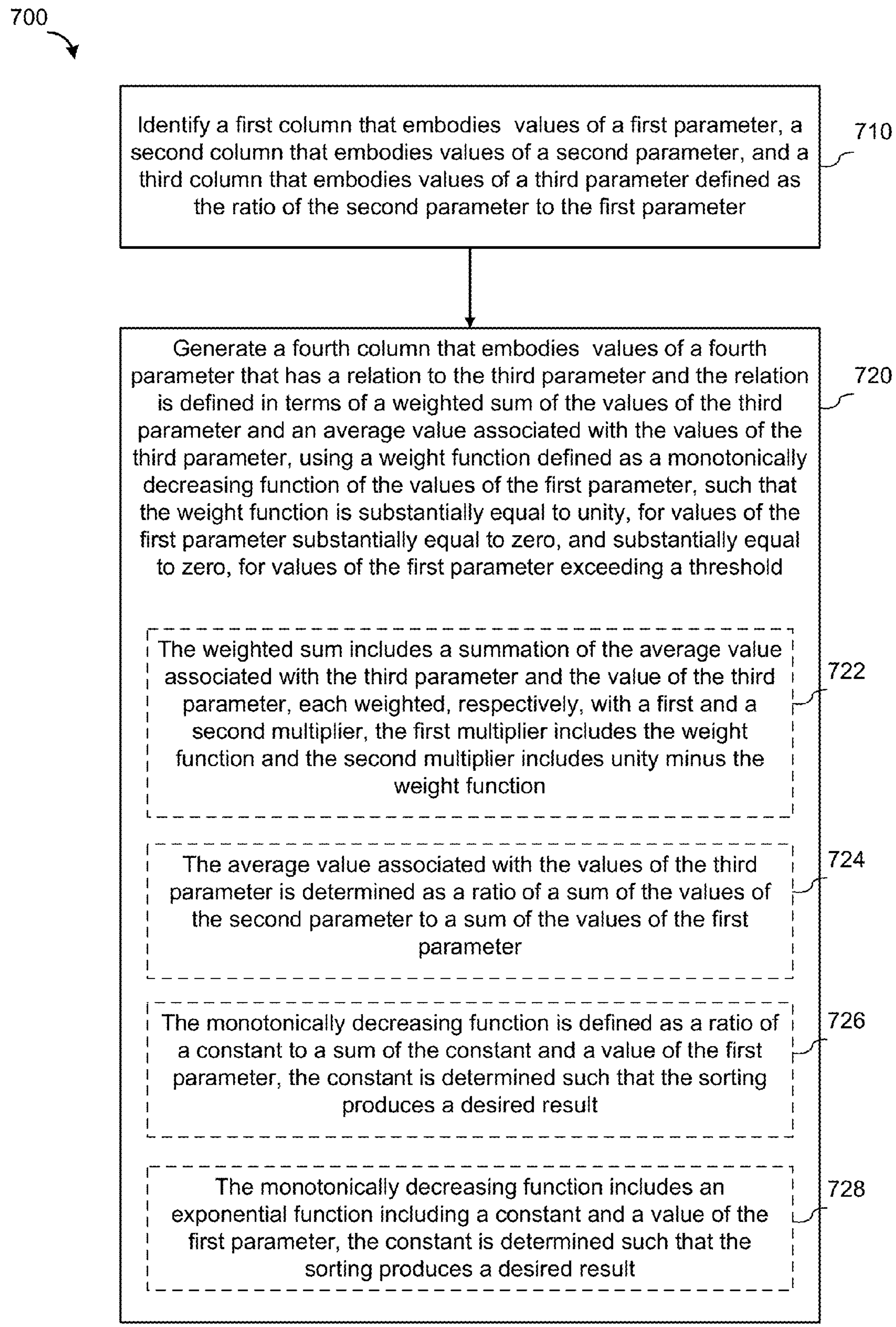
FIGS. 7A-7B are flowcharts of a method for sorting tables based on a column containing fractions, according to some embodiments.
Figure 7B:
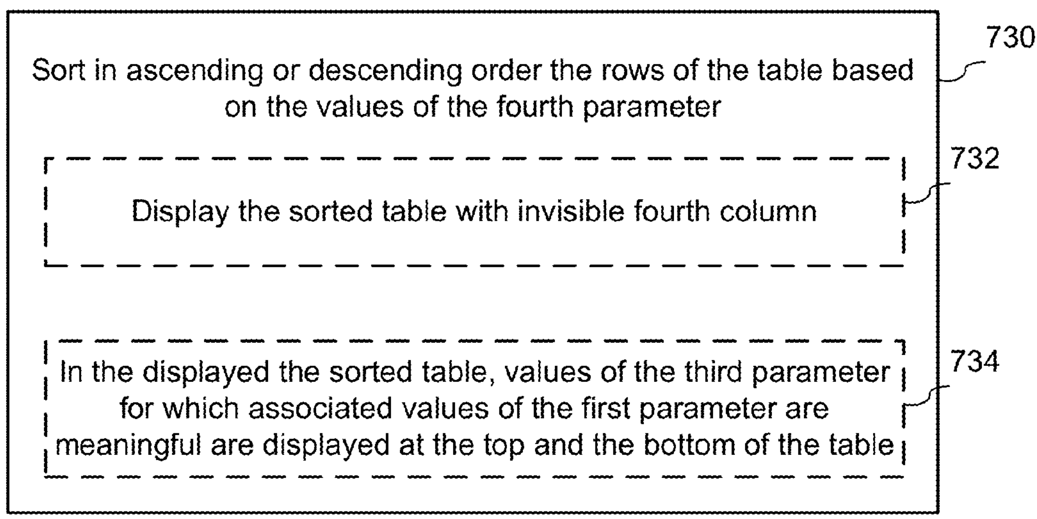

FIGS. 7A-7B are flowcharts of a method 700 for sorting tables based on a column containing fractions, according to some embodiments. The method 700 may be implemented by a standalone computer or the server system 306 of FIG. 5. The method 700, as described below relates to a number of operations on the Internet traffic data aggregated into a table such as Table 100 shown in FIG. 1.

In some embodiments, at operation 710, where the identification module 520 of FIG. 5 identifies the first column 104 representing values of the first parameter (i.e., A), the second column 106 representing values of the second parameter (i.e., B), and the third column 108 representing values of the third parameter defined as the ratio B/A (FIG. 1).

Subsequently (720), the generation module 522 generates the weighted-sort column 110 representing values of the fourth parameter (i.e., the weighted sum). As described with respect to FIGS. 1 and 2, the weighted sum WS, as given by Eq. 100 above, comprises a summation of terms, including the weight function W. The weight function W, as shown above and discussed with respect to FIG. 2, comprises a monotonically decreasing function of the parameter A that satisfies the condition equations 202 of FIG. 2.

In some embodiments (722), the summation shown in Eq. 100, where the third parameter (B/A) weighted by the (1-W), and the average value associated with the third parameter (i.e., $(\Sigma B/\Sigma A)$) weighted by W, are summed.

In some embodiments (724), the average value associated with the third parameter (i.e., $(\Sigma B/\Sigma A)$) is given as the ratio of $\Sigma B$ over $\Sigma A$.

In some embodiments (726), the weight function W is given as a monotonically decreasing function as given by Eq. 204 described above with respect to FIGS. 1 and 2.

In some embodiments (728), the weight function W is given as a monotonically decreasing function as given by Eq. 206 described above with respect to FIGS. 1 and 2.

In some example embodiments (730), the sorting module 524 of FIG. 5 sorts Table 100 of FIG. 1 in descending or ascending order based on the values of the weight sum WS stored in invisible weighted-sort column 110. The server system 306 of FIG. 5, after sorting Table 100, forwards the table to the client device 302 of FIG. 6.

Subsequently (732), the user interface module 606 is configured to display the table on the display 606. In the displayed table the fourth column (i.e., weighted sum column) is not displayed. In some embodiments, column 106 that stores the second parameter B (e.g., the number of bounces) may not be of interest to the user. In such embodiments, the user interface module 606 may be configured to make the column 106 invisible.

In some example embodiments, as a result of the sorting based on the weighted-sort column (i.e., the invisible column 110) a desired result is generated. The desired result in this case is defined as a sorted table, in which the values of the ratio B/A associated with "meaningful values" of the first parameter A are displayed in the top and bottom rows of the table, depending on whether the table is sorted in ascending or descending order based on the weighted sum WS.

Figure 8:
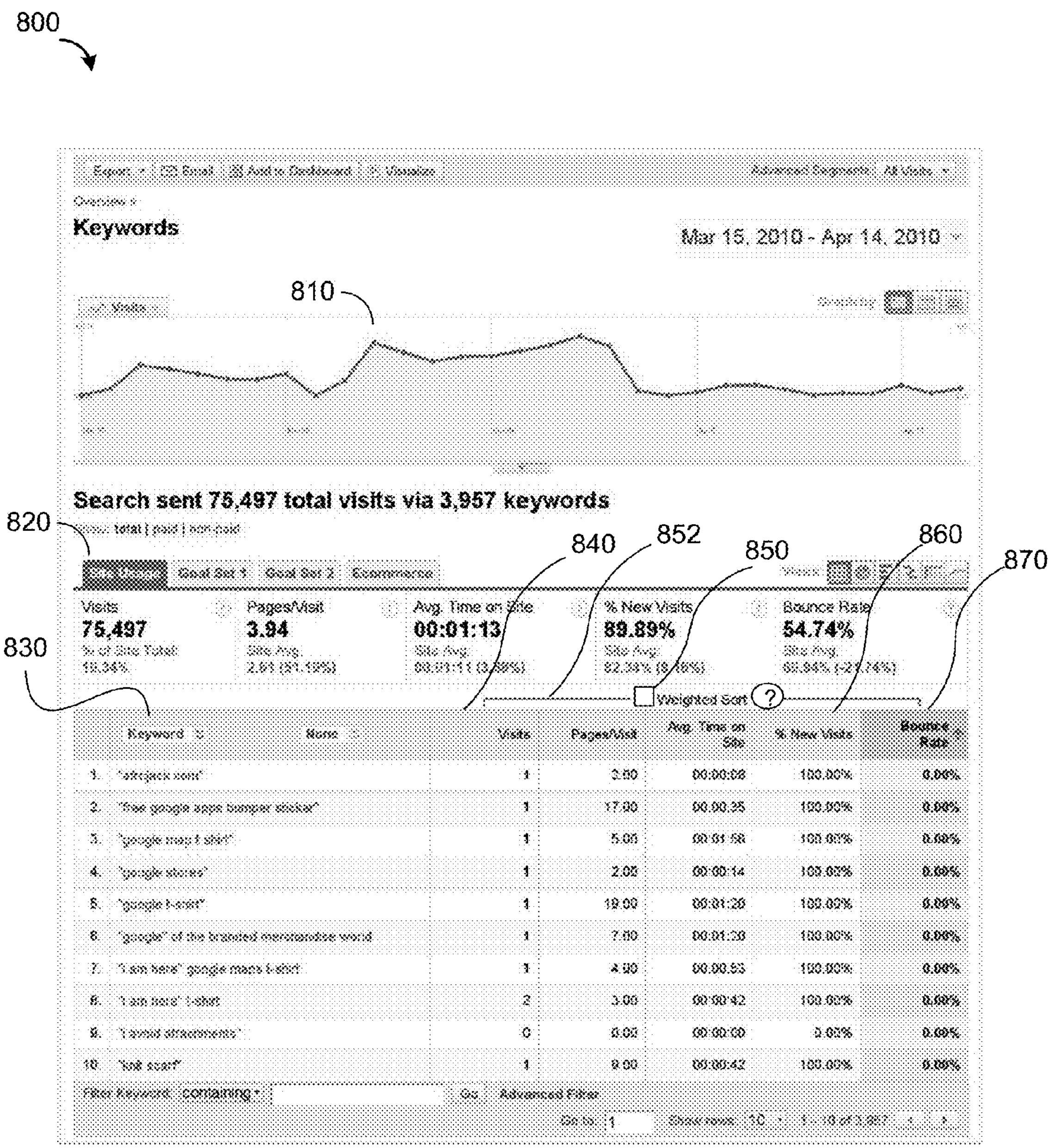
FIG. 8 is a screenshot illustrating an exemplary table sorted without using a weighted-sort column, according to some embodiments.

FIG. 8 is a screenshot illustrating an exemplary table 800 sorted without using a weighted-sort column, according to some embodiments. The table 800 is an example of Table 100 of FIG. 1 where selection of tab 820 cause the table 800 to display information, particularly on site usage aspect of Internet traffic data associated with a website. The Site usage information displayed in the table 800 is presented for keywords, based on a user's selection from the selection box 830. In some embodiments, the keywords may come from site visitors' search queries. Some columns of interest include column 840, containing the number of visits (i.e., the first parameter) of the website, column 860 including percentage of new visits, and column 870 representing bounce rates. Each row of the table 800 corresponds to a particular keyword.

As shown by the upward arrow in the title of the column 870, the table 800, as displayed is sorted in ascending order based on the bounce rate parameter. The column 870 is in fact a ratio column, since the bounce rate parameter, as defined above describes the ratio of the total number of bounces (not shown in the table 800) to the total number of visits. The sorting of table 800 based on the ratio column 870 has not produced a desired result, as the first ten rows of the table in the first viewable window include rows with the insignificant number of visits and no significant bounce rates. All of the bounce rate values in the first viewable window contain only 0% numbers. The bounce rates shown in column 870 are all 0% because they correspond to the number of pages/visit (i.e. values in column 860) that are all either greater than one or equal to zero (i.e., situations where a user immediately leaves a site without viewing any page other than the home page).

The table 800 also includes a chart 810 and display elements including a check box 850 and a connection indicator 852. The chart 810 displays a graphical representation of time variation of number of visits to the website. The connection indicator connects the ratio column 870 to the column 840 containing the number of visits. The check box 850, when checked, enables sorting of the table 800 based on a weighted sum, as described above with respect to FIG. 1. The connection indicator 852 may also change color (e.g., become darker) when the check box 850 is checked (see FIGS. 11-12). In FIG. 8, the check box 850 is not checked, as the table is sorted based on the ratio column 870 which is not a weighted sum column. Also note that column 870 is shown with a different level of shade and the numbers in that column are bolded to indicate that the table 800 was sorted based on column 870.

Figure 9:
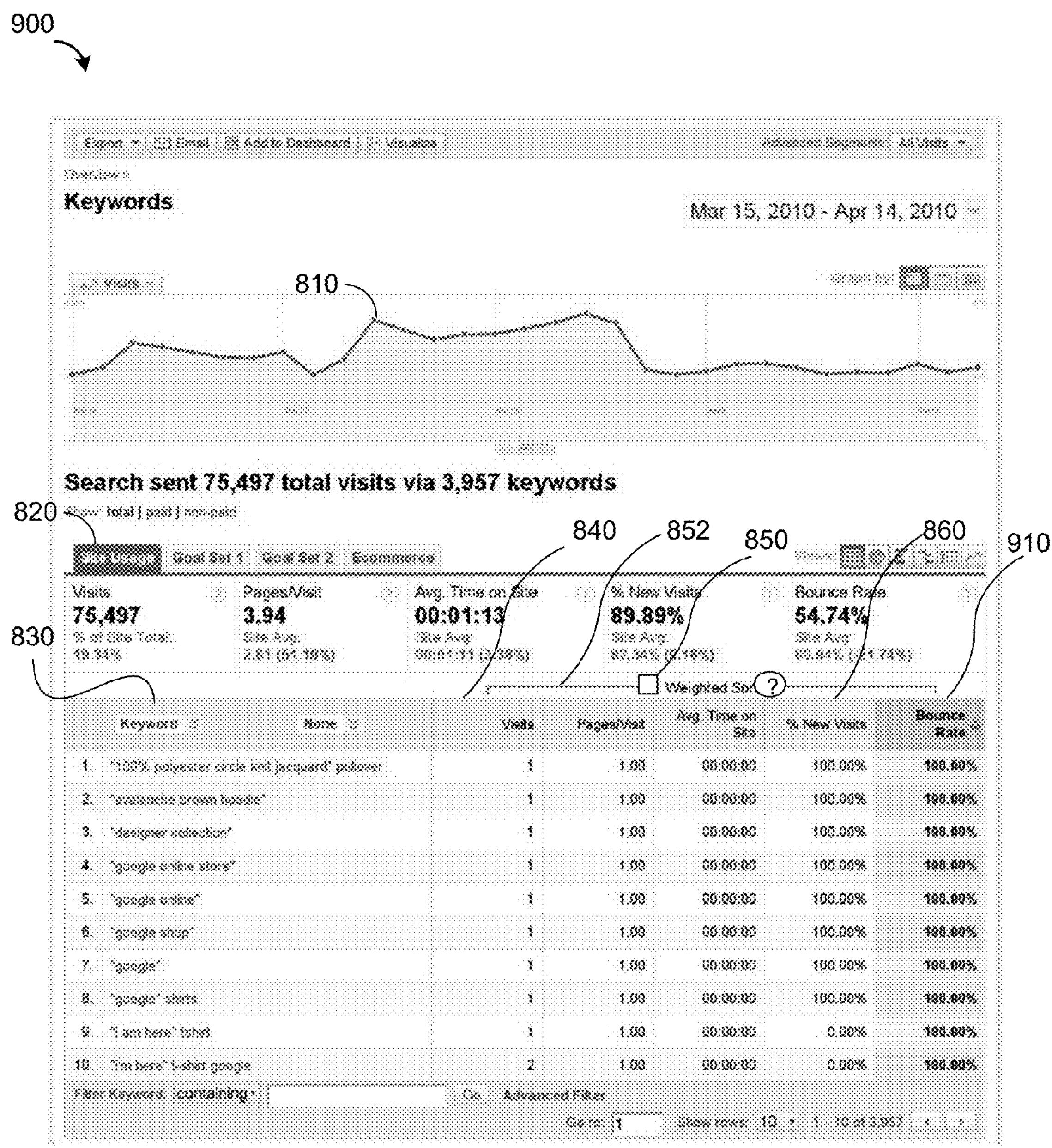
FIG. 9 is a screenshot illustrating another exemplary table sorted without using a weighted-sort column, according to some embodiments.

FIG. 9 is a screenshot illustrating another exemplary table 900 sorted without using a weighted-sort column, according to some embodiments. Table 900 is similar to the table 800 of FIG. 8, except for the column 910, which as shown in t FIG. 9 displays a downward arrow indicating sorting in descending order based on the bounce rate parameter. As illustrated the check box 850 is not checked, indicating that the performed sorting of table 900 is not based on a weighted sum. Again the top ten rows shown in the first viewable window does not include any desired result, as they include rows with the insignificant number of visits and all 100% bounce rate values. The shown bounce rates are all 100% because they correspond to the number of pages/visit (i.e. values in column 860) that are equal to one. Also note that column 910 is shown with a different level of shade and the numbers in that column are bolded to indicate that the table 900 was sorted based on column 910.

Figure 10:
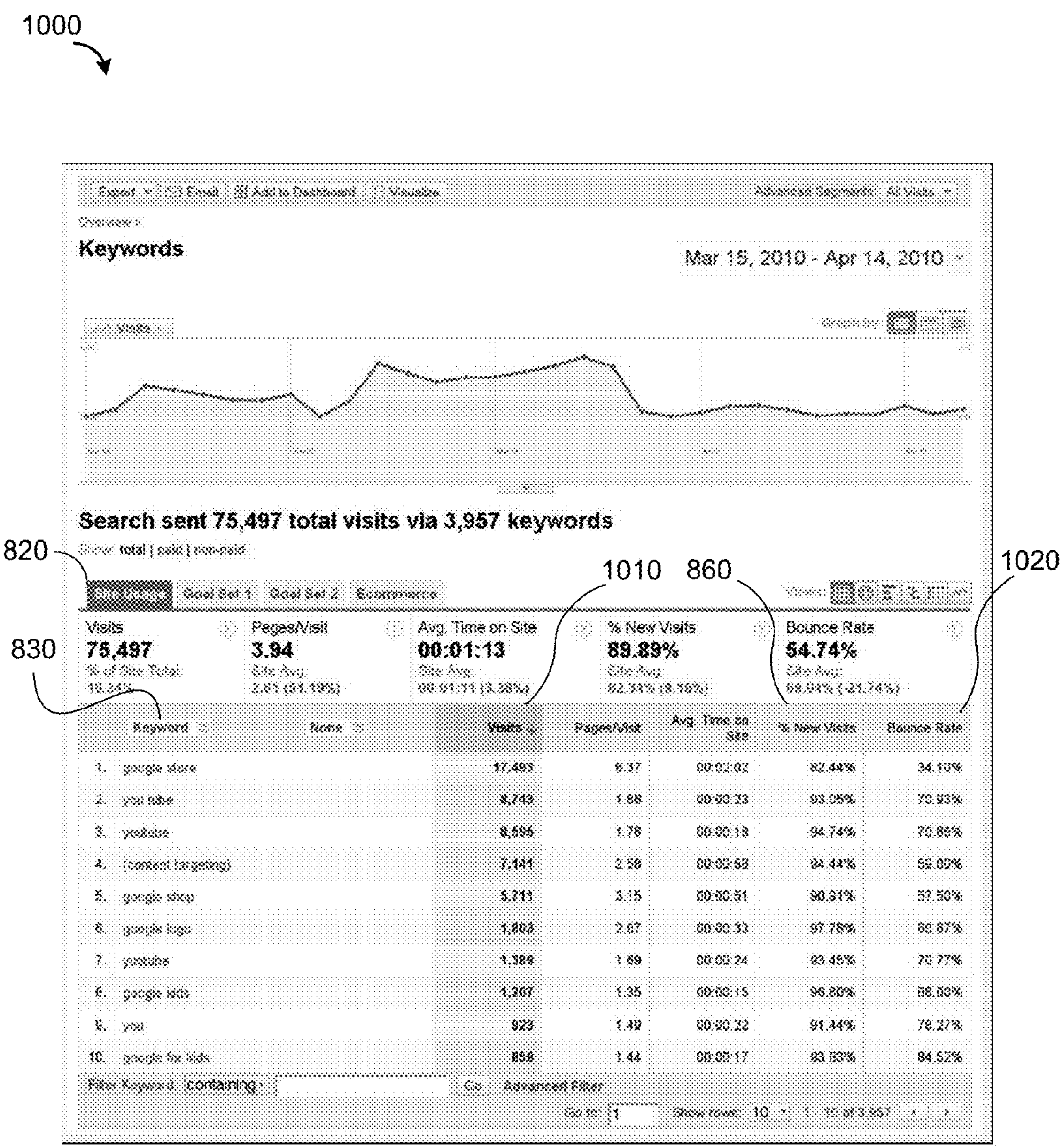
FIG. 10 is a screenshot illustrating an exemplary table sorted using a weighted-sort column, according to some embodiments.

FIG. 10 is a screenshot illustrating an exemplary table 1000 sorted without using a weighted-sort column, according to some embodiments. Table 1000 is similar to table 800, except that the visits column 1010 displays a downward arrow indicating that Table 1000 is sorted in descending order based on the first parameter (i.e., the number of visits). The column 1020 which represent the bounce rates, in this table is not used for sorting the table. The display elements 850 and 852 of FIG. 8 are absent here, since the table is not sorted based on the ratio column, instead is sorted based on the number of visits. The pages/visit and bounce rate values are non-integer, as they represent respective average values over large numbers of visits. Also note that column 1010 is shown with a different level of shade and the numbers in that column are bolded to indicate that the table 1000 was sorted based on column 1010. Since the table 1000 is not sorted based on the column 1020, the values in this column are not necessarily in descending or ascending order.

Figure 11:
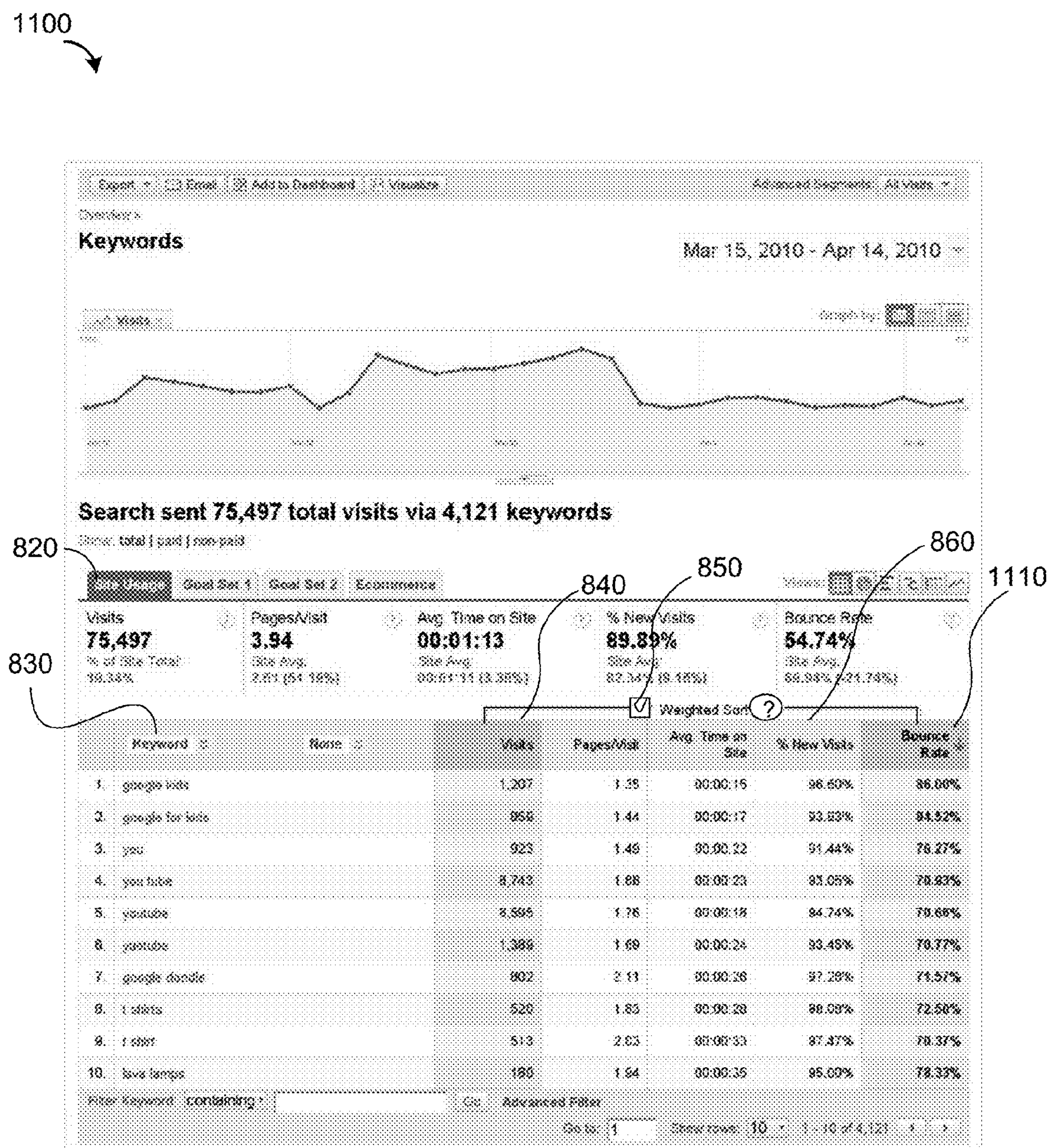
FIG. 11 is a screenshot illustrating another exemplary table sorted without using a weighted-sort column, according to some embodiments.

FIG. 11 is a screenshot illustrating another exemplary table 1100 using a weighted-sort column, according to some embodiments. As seen from the table 1100 the check box 850 is checked meaning that sorting the table based on an invisible weighted-sort column is enabled. The bounce rate column title displays a downward arrow indicating the descending order of sorting. However, since the check box 850 is checked, the user realizes that the table is not sorted based on the bounce rate; rather it is sorted based on the weighted-sort column that is not shown as a visible column in the table 1100. Also note that column 1110 is shown with a different level of shade and the numbers in that column are bolded to indicate that the table was sorted based on a weighted-sort column generated based on column 1110.

As a result of being sorted based on the invisible weighted-sort column, in the table 1100, meaningful values for the number of visits appear in the top rows of the table (and the bottom rows which are not visible in FIG. 11) and are readily accessible by a user. Thus, this is a clear show case of a benefit of sorting the table not based on a ratio, but based on a weighted sum associated with the ratio, as described above in detail with respect to FIGS. 1 and 2. Since the table 1100 is not sorted based on the column 1110, the values in this column are not necessarily in descending or ascending order.

Figure 12:
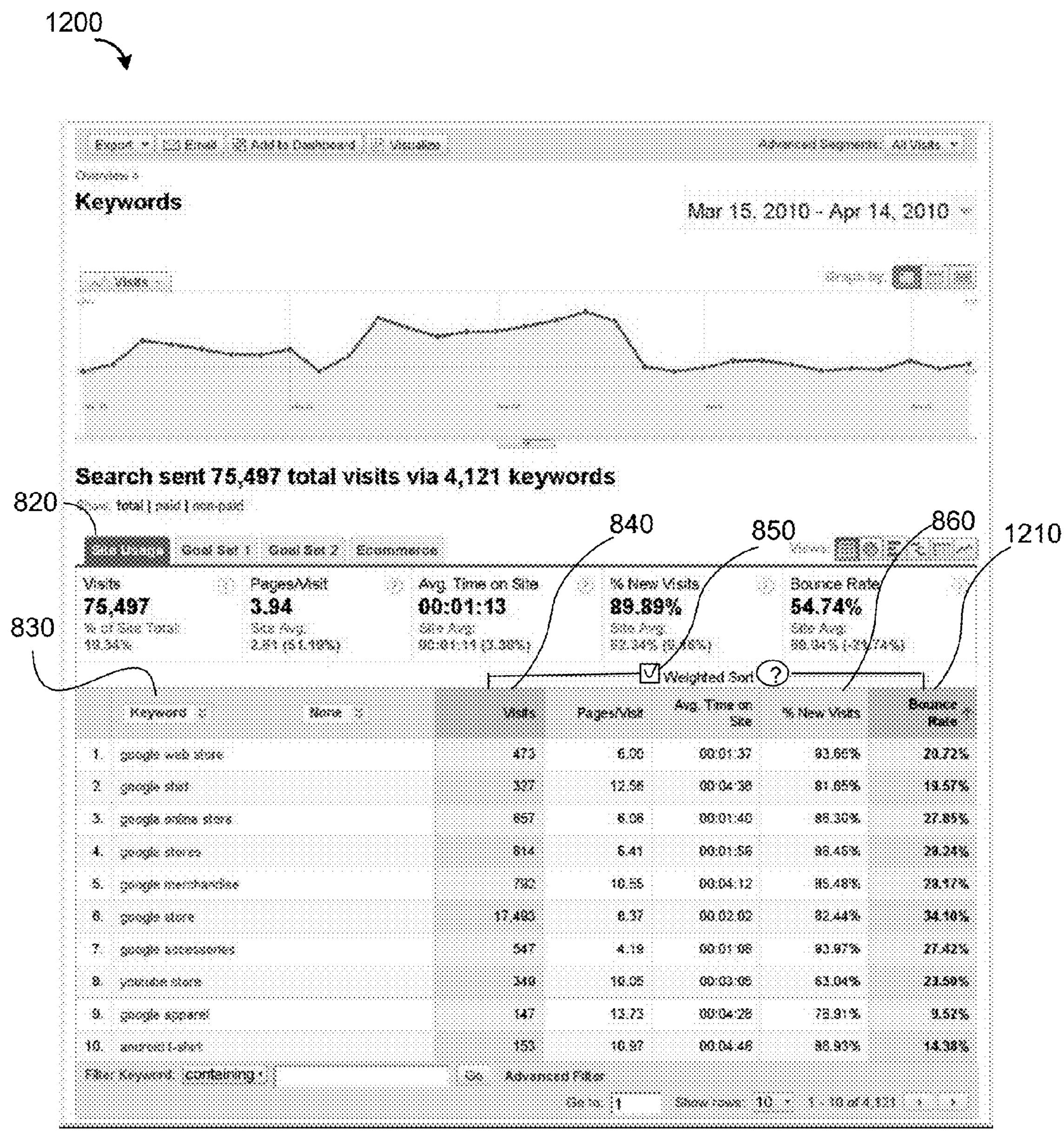
FIG. 12 is a screenshot illustrating another exemplary table sorted using a weighted-sort column, according to some embodiments.

FIG. 12 is a screenshot illustrating another exemplary table 1200 sorted using a weighted-sort column, according to some embodiments. The table 1200 is similar to table 1100, except that the sorting of the table is in ascending order as indicated by the downward arrow in the title of column 1210. Again, the check box 850 being checked is an indication that the table is not sorted based on the bounce rate; rather it is sorted based on the weighted-sort column that is not shown as a visible column in the table 1200. Also note that column 1210 is shown with a different level of shade and the numbers in that column are bolded to indicate that the table 1200 was sorted based on a weighted-sort column generated based on column 1210. Since the table 1200 is not sorted based on the column 1210, the values in this column are not necessarily in descending or ascending order.

As a result of being sorted based on the invisible weighted-sort column, in the table 1200, the values for the numbers of visits appearing in the top rows of the table, which are readily accessible by a user are the more meaningful values. Thus, this is another show case of the benefit of sorting the based on a weighted sum associated with the ratio, instead of the ratio itself, as described above in detail with respect to FIGS. 1 and 2.

Note that although the embodiments described herein are directed to sorting a table based on an invisible weighted-sort column, other embodiments may display the weighted-sort column as part of the displayed sorted table. Also, in other embodiments, a column representing numerators of the ratios discussed above (i.e. the number of bounces) may also be displayed in the sorted table. In general, the sorting method described herein may be applied to any large table containing a fraction column and is not limited to sorting tables including Internet traffic data. For example, the embodiments described herein may be used to sort financial tables, accounting tables, etc.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

I claim:

1. A method of sorting a set of data, the method comprising:

at a computing device including one or more processors, a display, and memory, formatting the set of data for display using a first data column and a second data column, wherein:

the first data column includes a first plurality of values; and the second data column includes a second plurality of values, wherein each of the second plurality of values is determined by combining a respective value of the first plurality of values with a respective value from another column that includes a plurality of values; and causing the set of data to be displayed in a sort order in accordance with a third plurality of sort parameters that includes one or more weighted sort parameters, wherein the third plurality of sort parameters is a function of the second plurality of values and each of the one or more weighted sort parameters is a function of a respective value of the first plurality of values.

2. The method of claim 1, further comprising:

in accordance with a determination that the respective value of the first plurality of values satisfies a predefined threshold, setting one of the one or more weighted sort parameters to a predetermined value.

3. The method of claim 1, wherein the second plurality of values is a ratio of a number of visits and a number of bounces associated with a webpage.

4. The method of claim 1, wherein the set of data is displayed in a table on a first portion of the display, and the method further comprises formatting for display, on a second portion of the display, a graph representing the set of data concurrently with the display of the table.

5. The method of claim 4, wherein the set of data is a first set of data, and further wherein the graph of the first set of data is displayed in accordance with a plurality of views of the first set of data over a period of time.

6. The method of claim 5, further comprising: formatting for display a second set of data concurrently with the first set of data, wherein the second set of data is distinct from but calculated in accordance with the first set of data.

7. The method of claim 1, further comprising:

responsive to a predefined user action, causing the set of data to be displayed in a second sort order in accordance with the first data column.

8. A computing system for sorting a set of data, the system comprising:

one or more processors;

a display; and memory storing one or more programs configured for execution by the one or more processors, the one or more programs comprising instructions for:

formatting the set of data for display using a first data column and a second data column, wherein:

the first data column includes a first plurality of values; and the second data column includes a second plurality of values, wherein each of the second plurality of values is determined by combining a respective value of the first plurality of values with a respective value from another column that includes a plurality of values; and causing the set of data to be displayed in a sort order in accordance with a third plurality of sort parameters that includes one or more weighted sort parameters, wherein the third plurality of sort parameters is a function of the second plurality of values and each of the one or more weighted sort parameters is a function of a respective value of the first plurality of values.

9. The system of claim 8, further comprising:

in accordance with a determination that the respective value of the first plurality of values satisfies a predefined threshold, setting one of the one or more weighted sort parameter to a predetermined value.

10. The system of claim 8, wherein the second plurality of values is a ratio of a number of visits and a number of bounces associated with a webpage.

11. The system of claim 8, wherein the set of data is displayed in a table on a first portion of the display, and the one or more programs further comprise instructions for formatting for display, on a second portion of the display, a graph representing the set of data concurrently with the display of the table.

12. The system of claim 11, wherein the set of data is a first set of data and further wherein the graph of the first set of data is displayed in accordance with a plurality of views of the first set of data over a period of time.

13. The system of claim 12, wherein the one or more programs further comprise instructions for: formatting for display, to a user, a second set of data concurrently with the first set of data, wherein the second get of data is distinct from but calculated in accordance with the first set of data.

14. The system of claim 8, wherein the one or more programs further comprise instructions for:

responsive to a predefined user action, causing the set of data to be displayed in a second sort order in accordance with the first data column.

15. A non-transitory computer-readable storage medium storing one or more programs configured for execution by one or more processors, the one or more programs comprising instructions for:

formatting the set of data for display using a first data column and a second data column, wherein:

the first data column includes a first plurality of values; and the second data column includes a second plurality of values, wherein each of the second plurality of values is determined by combining a respective value of the first plurality of values with a respective value from another column that includes a plurality of values; and causing the set of data to be displayed in a sort order in accordance with a third plurality of sort parameters that includes one or more weighted sort parameters, wherein the third plurality of sort parameters is a function of the second plurality of values and each of the one or more weighted sort parameters is a function of a respective value of the first plurality of values.

16. The non-transitory computer-readable storage medium of claim 15, further comprising:

in accordance with a determination that the respective value of the first plurality of values satisfies a predefined threshold, setting one of the one or more weighted sort parameter to a predetermined value.

17. The non-transitory computer-readable storage medium of claim 15, wherein the second plurality of values is a ratio of a number of visits and a number of bounces associated with a webpage.

18. The non-transitory computer-readable storage medium of claim 15, wherein the set of data is displayed in a table, and further comprising: formatting for display, a graph representing the set of data concurrently with the table.

19. The non-transitory computer-readable storage medium of claim 18, wherein the set of data is a first set of data and further wherein the graph of the first set of data is displayed in accordance with a plurality of views of the first set of data over a period of time.

20. The non-transitory computer-readable storage medium of claim 19, wherein the one or more programs further comprise instructions for: formatting for display, to a user, a second set of data concurrently with the first set of data, wherein the second set of data is distinct from but calculated in accordance with the first set of data.

* * * * *